United States Patent
Fulford et al.

(10) Patent No.: US 9,564,778 B2
(45) Date of Patent: Feb. 7, 2017

(54) STATOR CORE

(75) Inventors: Howard Charles Fulford, Malmesbury (GB); Stephen Greetham, Malmesbury (GB); Andrew Charlton Clothier, Malmesbury (GB); Matthew John Childe, Malmesbury (GB)

(73) Assignee: Dyson Technologies Limited, Malmesbury, Wiltshire (GB)

( * ) Notice: Subject to any disclaimer, the term of this patent is extended or adjusted under 35 U.S.C. 154(b) by 1571 days.

(21) Appl. No.: 12/709,293

(22) Filed: Feb. 19, 2010

(65) Prior Publication Data

US 2010/0225197 A1   Sep. 9, 2010

(30) Foreign Application Priority Data

Mar. 3, 2009   (GB) .................................. 0903662.5

(51) Int. Cl.
*H02K 1/14*   (2006.01)
*H02K 1/18*   (2006.01)
*H02K 21/18*   (2006.01)

(52) U.S. Cl.
CPC .............. *H02K 1/143* (2013.01); *H02K 1/185* (2013.01); *H02K 21/185* (2013.01); *H02K 2213/03* (2013.01)

(58) Field of Classification Search
CPC ....... H02K 1/143; H02K 21/185; H02K 1/185
USPC ..................... 310/49.23, 49.24, 49.25, 49.26, 49.31,310/49.34, 49.35, 49.44, 216.019, 216.021,310/216.023, 216.096, 216.097, 216.111, 269,310/154.38, 49.17, 156.38, 156.39, 156.44,310/156.45, 156.46
See application file for complete search history.

(56) References Cited

U.S. PATENT DOCUMENTS

| | | | | | |
|---|---|---|---|---|---|
| 2,298,388 | A | * | 10/1942 | Knobel | 310/216.097 |
| 2,460,921 | A | * | 2/1949 | Candy | 336/133 |
| 2,606,083 | A | * | 8/1952 | Burian et al. | 384/420 |
| 3,991,332 | A | * | 11/1976 | Kawamura et al. | 310/49.32 |
| 4,095,130 | A | * | 6/1978 | Oshima et al. | 310/162 |
| 4,156,821 | A | * | 5/1979 | Kurome et al. | 310/166 |
| 4,162,418 | A | * | 7/1979 | Kawaki et al. | 310/49.23 |
| 4,224,544 | A | * | 9/1980 | McKinnon et al. | 310/90 |
| 4,311,934 | A | * | 1/1982 | Flaig | 310/216.035 |
| 4,329,601 | A | * | 5/1982 | Mai | 310/49.54 |
| 4,528,533 | A | * | 7/1985 | Montagu | 335/230 |
| 4,565,955 | A | * | 1/1986 | Kubota | 318/696 |
| 4,777,394 | A | * | 10/1988 | Hayashi | 310/83 |
| 4,855,629 | A | * | 8/1989 | Sato | 310/49.33 |
| 5,675,226 | A | * | 10/1997 | Riola' | 318/400.41 |
| 6,271,638 | B1 | * | 8/2001 | Erdman et al. | 318/400.01 |

(Continued)

FOREIGN PATENT DOCUMENTS

EP   0-278-200   8/1988
EP   1 261 101   11/2002

(Continued)

OTHER PUBLICATIONS

GB Search Report directed at application No. GB0903662.5 dated Jun. 24, 2009; 2 pages.

(Continued)

*Primary Examiner* — Naishadh Desai
(74) *Attorney, Agent, or Firm* — Morrison & Foerster LLP

(57) ABSTRACT

A stator core that includes a pair of poles separated by an air gap. Each pole includes a first side adjacent the air gap and a second opposite side remote from the air gap. A pole arc is formed in the first side and an arcuate mounting recess is formed in the second side of each pole. Additionally, an electric machine that includes the stator core.

17 Claims, 2 Drawing Sheets

(56) References Cited

U.S. PATENT DOCUMENTS

| | | | |
|---|---|---|---|
| 6,809,452 B2 * | 10/2004 | Cho et al. | 310/216.001 |
| 6,975,049 B2 * | 12/2005 | Ionel et al. | 310/49.01 |
| 7,109,621 B2 * | 9/2006 | Lesak | 310/90 |
| 7,259,487 B2 * | 8/2007 | Mullin et al. | 310/91 |
| 7,479,755 B2 * | 1/2009 | Acquaviva et al. | 318/720 |
| 2006/0038452 A1 | 2/2006 | Lesak | |

FOREIGN PATENT DOCUMENTS

| | | |
|---|---|---|
| EP | 1 713 164 | 10/2006 |
| GB | 740839 | 11/1955 |
| GB | 2 123 221 | 1/1984 |
| GB | 2 407 712 | 5/2005 |
| JP | 57-28391 | 2/1982 |
| JP | 63-681 | 1/1988 |

OTHER PUBLICATIONS

Search Report dated Jul. 25, 2014, directed to GB Application 1411971.3; 1 page.

* cited by examiner

STATOR CORE

REFERENCE TO RELATED APPLICATIONS

This application claims the priority of United Kingdom Application No. 0903662.5, filed Mar. 3, 2009, the entire contents of which are incorporated herein by reference.

FIELD OF THE INVENTION

The present invention relates to a stator core for an electric machine, and to an electric machine incorporating the same.

BACKGROUND OF THE INVENTION

Various methods are available for securing a stator within the housing of an electric machine. One such method involves the provision of through-holes in the stator core. The stator core may then be secured to the housing by bolts that pass through the holes. Typically, however, the through-holes adversely affect the magnetic flux through the stator core and thus the performance of the electric machine is compromised.

SUMMARY OF THE INVENTION

In a first aspect, the present invention provides a stator core comprising a pair of poles separated by an air gap, each pole comprising a first side adjacent the air gap, a second opposite side remote from the air gap, a pole arc formed in the first side, and an mounting recess formed in the second side, wherein the mounting recess is semi-circular and has a depth that is at least 20% of the distance between the first side and the second side.

The stator core may then be held within an electric machine by posts, bolts or other means received with the mounting recesses. By providing mounting recesses on the sides of the poles, the impact on the magnetic flux distribution through the stator core is much smaller than that of a through-hole. Indeed, the position and size of the mounting recesses is ideally selected such that the recesses do not impact, or impact only marginally, on the saturation of the stator core. Moreover, by providing mounting recesses on the sides of the poles, movement of the poles relative to a rotor of the electric machine is better restricted and thus the performance of the electric machine is improved.

By having mounting recesses that are semi-circular in shape, the forces acting on the stator core during subsequent use may be more evenly distributed over the means used to hold the stator core. Moreover, since each mounting recess has a radius that is at least 20% of the distance between the first side and the second side, the size of each mounting recess is relatively large. As a result, the means used to hold the stator core may be equally large. The stator core may then be held by plastic posts, which, being made of plastic, are preferably large in order to oppose the forces acting on the stator during subsequent use.

Preferably, the stator core has a minimal width between the outer perimeter and the inner perimeter of the stator core, and the shortest distance between an edge of each mounting recess and the inner perimeter of the stator core is at least that of the minimal width. Accordingly, neither of the mounting recesses generates a bottleneck or other restriction in the cross-sectional area of the stator core; the magnetic saturation of the stator core is thus unaffected by the mounting recesses.

The shortest distance between an edge of each mounting recess and a respective pole arc is advantageously at least half the minimal width of the stator core. Again, this then ensures that the mounting recesses do not adversely affect the magnetic saturation of the stator core.

The stator core may comprise a back and a pair of necks, each neck connecting a respective pole to the back. The shortest distance between an edge of each mounting recess and the inner perimeter of the stator core is then ideally at least equal to a width of one of the back and necks. The width of each pole is generally greater than that of the back and necks in order that the poles provide effective capture of rotor flux. By ensuring that the distance between each mounting recess and the inner perimeter of the stator core is at least the width of the back or necks, the mounting recesses do not adversely affect the magnetic saturation of the stator core.

The stator core may comprise a back and a pair of necks, each neck connecting a respective pole to the back. The width of at least one neck may then increase at an end adjacent the respective pole. By increasing the width of the neck adjacent the pole, any restriction in cross-sectional area that would otherwise arise because of the mounting recess may be compensated.

Each pole may comprise a pole arc extending between a leading edge and a trailing edge, with the leading edge being wider than the trailing edge. This asymmetry in the poles then provides a stator of lower inductance without lowering the saturation.

Advantageously, the stator core is c-shaped. A winding may then be more easily wound on to the stator core via the slot opening between the poles. Additionally, a high fill factor for the winding can be achieved, which then reduces copper losses and thus improves efficiency. Furthermore, owing to the generally square or rectangular shape of the stator core, the stator core may be formed by stamping or cutting sheet material with little waste.

Reference herein to a c-shaped stator core should also be understood to include u-shaped stator cores.

Preferably, the stator core is formed of a plurality of single-piece laminations. Owing to the location of the mounting recesses, the laminations may be stamped or cut from sheet material such that mounting recesses of two adjacent laminations define a circular hole, thus simplifying manufacture.

In a second aspect, the present invention provides a c-shaped stator core comprising a pair of poles separated by an air gap, a back, and a pair of necks, each neck connecting a respective pole to the back, wherein each pole comprises a first side adjacent the air gap, a second opposite side remote from the air gap, a pole arc formed in the first side, and an arcuate mounting recess formed in the second side directly behind the pole arc.

In a third aspect, the present invention provides an electric machine comprising a housing and a stator core as described in any one of the preceding paragraphs, the housing comprising a pair of posts, and the stator core being mounted within the housing such that each post is received within a respective mounting recess.

The housing is preferably formed of plastic. This then has the advantage that the housing is neither subjected to inductive heating nor does it present a partial short to the magnetic circuit. Furthermore, the housing is cheaper that an equivalent housing formed of a non-magnetic metal.

Advantageously, the posts are hollow and can thus receive a screw or the like. The electric machine may then comprise a printed circuit board that overlies the stator core and is screwed to the posts. For example, the printed circuit board may include a pair of through-holes, each of which aligns with a respective post and through which a screw projects into a hollow post. This then has the advantage of providing a compact electric machine.

The electric machine may additionally include a rotor comprising a shaft to which are mounted a rotor core and a bearing. The bearing is then advantageously mounted within a bore in the housing such that the rotor core is supported between the poles of the stator core. By securing the stator core and the rotor to the same housing, alignment of the rotor core relative to the stator core is made easier.

BRIEF DESCRIPTION OF THE DRAWINGS

In order that the present invention may be more readily understood, an embodiment of the invention will now be described, by way of example, with reference to the accompanying drawings, in which.

DETAILED DESCRIPTION OF THE INVENTION

Figure 1:
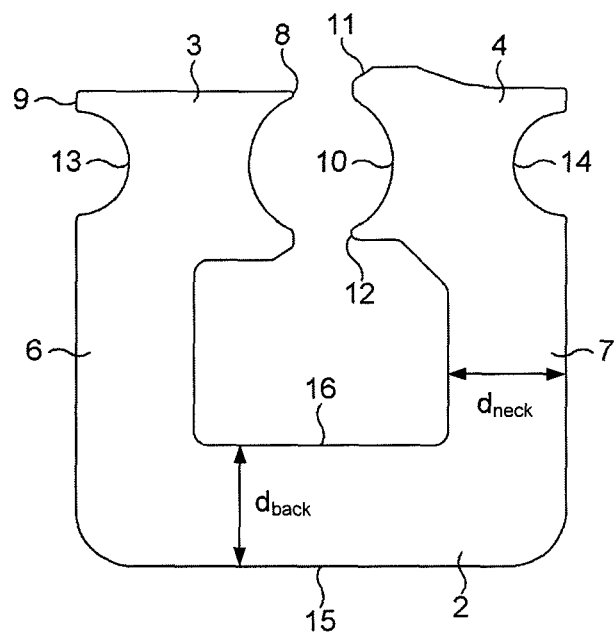
FIG. 1 is a plane view of a stator core in accordance with the present invention.

The stator core 1 of FIG. 1 is c-shaped and comprises a back 2, a pair of asymmetric poles 3,4 separated by an air gap 5, and a pair of necks 6,7 extending between the back 2 and the poles 3,4.

Each pole 3,4 has a first side or face 8 adjacent the air gap 5 and a second side or back 9 remote from the air gap 5. Each pole face 8 includes an arcuate recess or pole arc 10 that extends between a leading edge 11 and a trailing edge 12. The leading edge 11 of each pole 3,4 is wider than that of the trailing edge 12. Additionally, the leading edge 11 of each pole 3,4 is chamfered. By providing narrower trailing edges 12 and chamfering the corners of the leading edges 11, the inductance of any winding wound about the stator core 1 is reduced. However, in having wider leading edges 11, the saturation of the stator core 1 at the leading edges is increased. Consequently, the asymmetry in the poles 3,4 provides a stator of lower inductance without lowering the saturation.

A pair of mounting recesses 13,14 is formed in the outer perimeter 15 of the stator core 1. Each mounting recess 13,14 is semi-circular and is formed in the back 9 of a respective pole 3,4.

The mounting recesses 13,14 provide means by which the stator core 1 may be secured to a frame, housing or the like of an electric machine, as will now be demonstrated.

Figure 3:
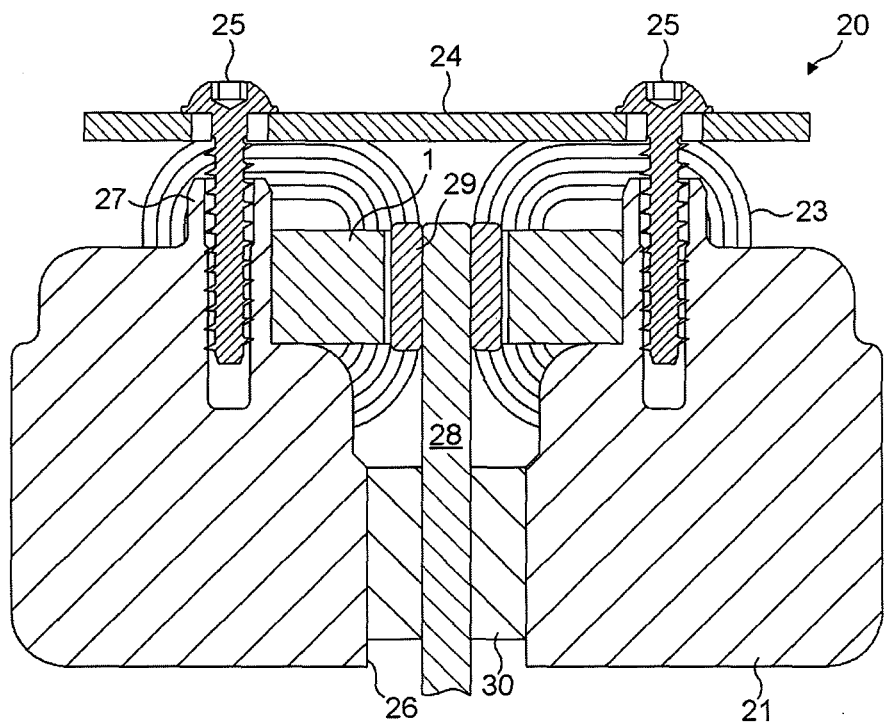
FIG. 3 is a sectional view of the electric machine of FIG. 2.
Figure 2:
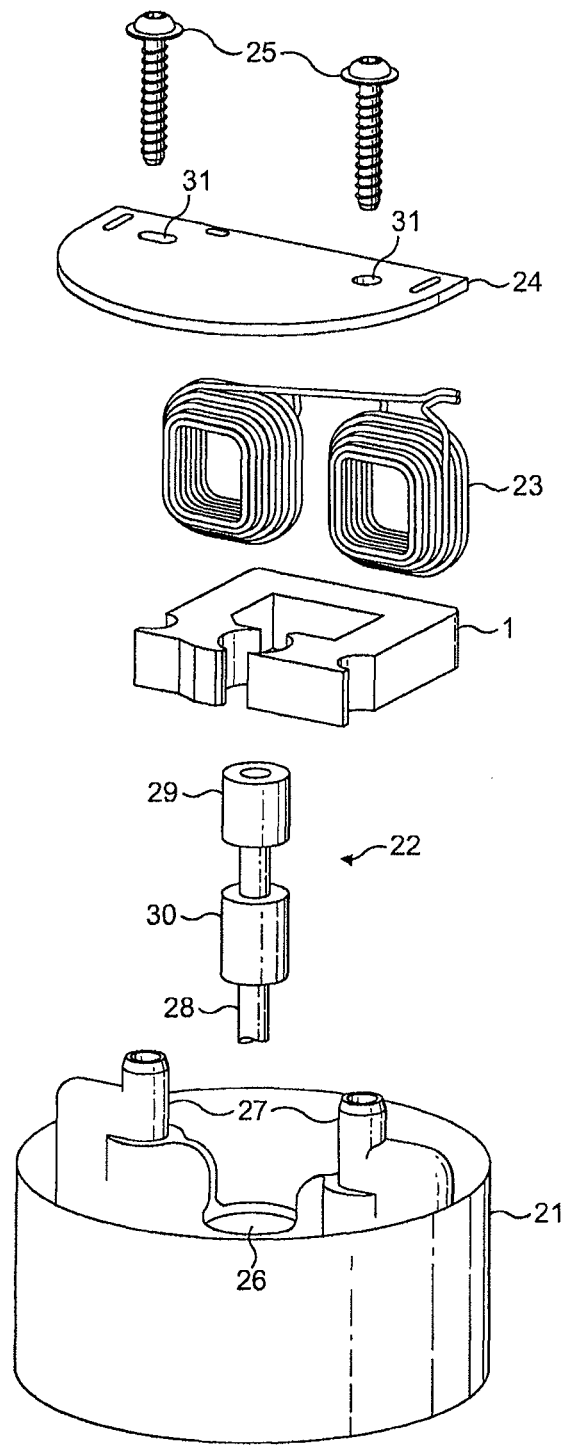
FIG. 2 is an exploded view of an electric machine in accordance with the present invention.

FIGS. 2 and 3 illustrate an electric machine 20 incorporating the stator core 1. In addition to the stator core 1, the electric machine 20 comprises a housing 21, a rotor 22, a winding 23, a printed circuit board (PCB) 24, and a pair of non-magnetic screws 25.

The housing 21 is formed of plastic and includes a central bore 26 and a pair of hollow posts 27.

The stator core 1 is mounted within the housing 21 such that each post 27 is received within a respective mounting recess 13,14 in the stator core 1. The winding 23 is wound about the necks 6,7 of the stator core 1. However, the winding 23 might equally be wound about the back 2 of the stator core 1.

The rotor 22 comprises a shaft 28 to which are mounted a rotor core 29 and a bearing assembly 30. The bearing assembly 30 is mounted within the central bore 26 of the housing 21 such that the rotor core 29 is supported between the poles 3,4 of the stator core 1. By securing the stator core 1 and the rotor 22 to the same housing 21, alignment of the rotor core 29 relative to the stator core 1 is made easier.

The PCB 24 includes a pair of through-holes 31 and overlies the stator core 1 such that each of the through-holes 31 is aligned with a respective post 27 of the housing 21. The winding 23 is electrically coupled to the PCB 24.

The PCB 24 and the stator core 1 are secured to the housing 21 by the non-magnetic screws 25, which pass through the through-holes 31 in the PCB 24 and screw into the posts 27 of the housing 21.

By providing mounting recesses 13,14 on opposite sides of the stator core 1, the posts 27 of the housing 21 prevent translational and rotational movement of the stator core 1 in the x-y plane. This is particularly important since the interaction of the armature field and rotor field generates forces that act on the stator core 1 within this plane. It is not therefore necessary to screw down tightly the stator core 1 to the housing 21 in order to oppose these forces. Furthermore, in providing mounting recesses 13,14 on opposite sides of the stator core 1, only two recesses 13,14 are required in order to prevent movement of the stator core 1 within the x-y plane.

The forces arising from the interaction of the armature and rotor fields act on the poles 3,4 of the stator core 1. By providing mounting recess 13,14 at the backs 9 of the poles 3,4, movement of the poles 3,4 relative to the rotor core 29 is better restricted. By contrast, if mounting recesses were located on the back 2 of the stator core 1, the forces acting on the poles 3,4 would cause the poles 3,4 to move, albeit by a small amount, owing to the flexibility in the necks 6,7. Any movement of the poles 3,4 relative to the rotor core 29 would impact on the performance of the electric machine 20. By providing mounting recesses 13,14 on the backs 9 of the poles 3,4, the positions of the poles 3,4 is better controlled and thus the electric machine 20 has improved performance.

The housing 21 of the electric machine 20 is formed of plastic. Consequently, the housing 21 is neither subjected to inductive heating nor does it present a partial short to the magnetic circuit. Additionally, the housing 21 may be manufactured more cheaply in comparison to an equivalent housing formed of a non-magnetic metal. However, in being formed of plastic, a relatively large diameter is required for the posts 27 in order that the posts 27 can oppose the relatively large forces acting on the stator core 1. The size of the posts 27 are also limited by the size of the screws 25 used to secure the stator core 1 and PCB 24 to the housing 21. For these reasons, each mounting recess 13,14 is at least 20% of the pole length, i.e. the distance between the face 8 and the back 9 of each pole 3,4.

By providing mounting recesses 13,14 in the outer perimeter 15 of the stator core 1, the impact on the magnetic flux distribution through the stator core 1 is smaller than that of an equivalent through-hole. Moreover, each mounting recess 13,14 is only half the size of a through-hole. Consequently, the overall effect on the magnetic flux distribution through the stator core 1 is much smaller than that of a through-hole. Moreover, as will now be explained, the mounting recesses 13,14 are formed at positions that do not decrease the saturation of the stator core 1.

Returning to FIG. 1, the stator core 1 has a cross-sectional area normal to lines of magnetic flux through the stator core 1. This cross-sectional area is non-uniform around the stator core 1. In particular, the cross-sectional area increases at the corners of the stator core 1 as the magnetic flux turns through 90 degrees. Additionally, the cross-sectional area of the poles 3,4 is greater than that of the back 2 and the necks 6,7 of the stator core 1; a greater cross-sectional area at the poles 3,4 is necessary in order that the poles 3,4 provide effective capture of the rotor flux. By providing mounting recesses 13,14 on the backs 9 of the poles 3,4, the mounting recesses 13,14 are located at positions for which the cross-sectional area of the stator core 1 is greatest. Consequently, the impact of the mounting recesses 13,14 on the magnetic saturation of the stator core 1 is minimal. Indeed, the mounting recesses 13,14 ideally have no effect on the magnetic saturation of the stator core 1, i.e. the mounting recesses 13,14 do not create a bottleneck or other restriction in the cross-sectional area of stator core 1.

Since the stator core 1 is of uniform depth or thickness, the saturation of the stator core 1 may be discussed with reference to the width of the stator core 1. For the purposes of this discussion, the width of the stator core 1 is the distance between the outer perimeter 15 and the inner perimeter 16 of the stator core 1—e.g., $d_{back}$, $d_{neck}$. The width of the stator core 1 has a minimum. As already noted, the poles 3,4 are wider than the back 2 and necks 6,7 of the stator core 1 in order that the poles 3,4 provide effective capture of the rotor flux. The stator width therefore has a minimum at some point along the back 2 ($d_{back}$) or neck 6,7 ($d_{neck}$) of the stator core 1. Ideally, the shortest distance between the edge of each mounting recess 13,14 and the inner perimeter 16 of the stator core 1 is no less than the minimal width of the stator core 1. Additionally, the shortest distance between the edge of each mounting recess 13,14 and a respective pole arc 10 is no less than half the minimal width of the stator core 1. Consequently, the mounting recesses 13,14 do not form a bottleneck or other restriction in the stator core 1 and do not therefore reduce the saturation of the stator core 1.

As noted above, the posts 27 of the housing 21 are relatively large and thus the mounting recesses 13,14 are equally relatively large. For the particular size of mounting recess 13,14 illustrated in FIG. 1, as well as in the asymmetry in the poles 3,4, one of the mounting recesses 14 creates a restriction in the width of the stator core 1. Accordingly, in order to compensate for this restriction, the width of the corresponding neck 7 increases at the end adjacent the pole 3. Consequently, the distance between the edge of the mounting recess 14 and the inner perimeter 16 of the stator core 1 continues to be no less than the minimal width of the stator core 1.

In the embodiment described above, the stator core 1 is held within the housing 21 by posts 27 that form an integral part of the housing 21. However, the stator core 1 might equally be held by alternate means. For example, the stator core 1 might be bolted to the housing 21 by a pair of bolts, each bolt extending through and received within a mounting recess 13,14 in the stator core 1.

If conventional through-holes were formed in the stator core, the through-holes would reduce the saturation of the stator core. This reduction in saturation might be addressed by making the stator core wider at the points where the through-holes are located. However, not only would this increase the overall size of the stator core, but it would also increase the cost of the stator core owing to the required additional material. In contrast, the stator core 1 of the present invention includes mounting recesses 13,14 that are formed within the normal profile of the stator core 1. Consequently, a more compact and cheaper stator core 1 may be realised. Moreover, owing to the generally square profile of the stator core 1, the stator core laminations can be produced by stamping or cutting sheet material (e.g. steel) with little waste.

The invention claimed is:

1. A c-shaped stator core comprising a pair of poles separated by an air gap, each pole comprising a first side adjacent the air gap, a second opposite side remote from the air gap, a pole arc formed in the first side, and a mounting recess formed in the second side, wherein the mounting recess is semi-circular, is located wholly behind the pole arc, and has a depth that is at least 20% of the distance between the first side and the second side.

2. The stator core of claim 1, wherein the stator core has a minimal width between an outer perimeter and an inner perimeter of the stator core, and the shortest distance between an edge of each mounting recess and the inner perimeter of the stator core is at least that of the minimal width.

3. The stator core of claim 2, wherein the shortest distance between an edge of each mounting recess and a respective pole arc is at least half the minimal width.

4. The stator core of claim 1, wherein the stator core comprises a back and a pair of necks, each neck connecting a respective pole to the back, and wherein the shortest distance between an edge of each mounting recess and an inner perimeter of the stator core is at least equal to a width of one of the back and the necks, the width corresponding to the distance between the outer perimeter and the inner perimeter of the stator core.

5. The stator core of claim 1, wherein the stator core comprises a back and a pair of necks, each neck connecting a respective pole to the back, and the width of at least one neck increases at an end adjacent the respective pole.

6. The stator core of claim 1, wherein each pole comprises a pole arc extending between a leading edge and a trailing edge, and the leading edge is wider than the trailing edge.

7. The stator core of claim 1, wherein stator core is formed of a plurality of single-piece laminations.

8. A c-shaped stator core comprising a pair of poles separated by an air gap, a back, and a pair of necks, each neck connecting a respective pole to the back, wherein each pole comprises a first side adjacent the air gap, a second opposite side remote from the air gap, a pole arc formed in the first side, and an arcuate mounting recess formed in the second side, the mounting recess being located wholly behind the pole arc.

9. The stator core of claim 8, wherein each mounting recess is semi-circular.

10. The stator core of claim 9, wherein each mounting recess has a depth of at least 20% of the distance between the first side and the second side of a respective pole.

11. The stator core of claim 8, wherein the shortest distance between an edge of each mounting recess and an inner perimeter of the stator core is at least equal to a width of one of the back and the necks, the width corresponding to the distance between the outer perimeter and inner perimeter of the stator core.

12. An electric machine comprising a housing and a stator core as claimed in claim 1 or 8, the housing comprising a pair of posts, and the stator core being mounted within the housing such that each post is received within a respective mounting recess.

13. The electric machine of claim 12, wherein the housing is formed of plastic.

14. The electric machine of claim 12, wherein the posts are hollow.

15. The electric machine of claim 12, wherein the electric machine comprises a printed circuit board that overlies the stator core and is screwed to the posts.

16. The electric machine of claim 12, wherein the electric machine comprises a rotor, the rotor comprising a shaft to which are mounted a rotor core and a bearing assembly, and the bearing assembly is mounted within a bore in the housing such that the rotor core is supported between the poles of the stator core.

17. An electric machine comprising a housing, a stator core and a printed circuit board, wherein:
   the housing comprises a pair of hollow posts;
   the stator core comprises a pair of poles separated by an air gap, each pole comprising a first side adjacent the air gap, a second opposite side remote from the air gap, a pole arc formed in the first side, and a mounting recess formed in the second side directly behind the pole arc; and
   the printed circuit board overlies the stator core and is screwed to the posts so that the stator core is housed by the printed circuit board and the housing.

\* \* \* \* \*